Sept. 17, 1929.  C. W. WEISS  1,728,383
POWER TRANSMISSION DEVICE
Filed Feb. 25, 1927   4 Sheets-Sheet 1

Inventor
Carl W. Weiss
By his Attorneys
Redding, Greeley, O'Shea & Campbell

Sept. 17, 1929.  C. W. WEISS  1,728,383
POWER TRANSMISSION DEVICE
Filed Feb. 25, 1927  4 Sheets-Sheet 2
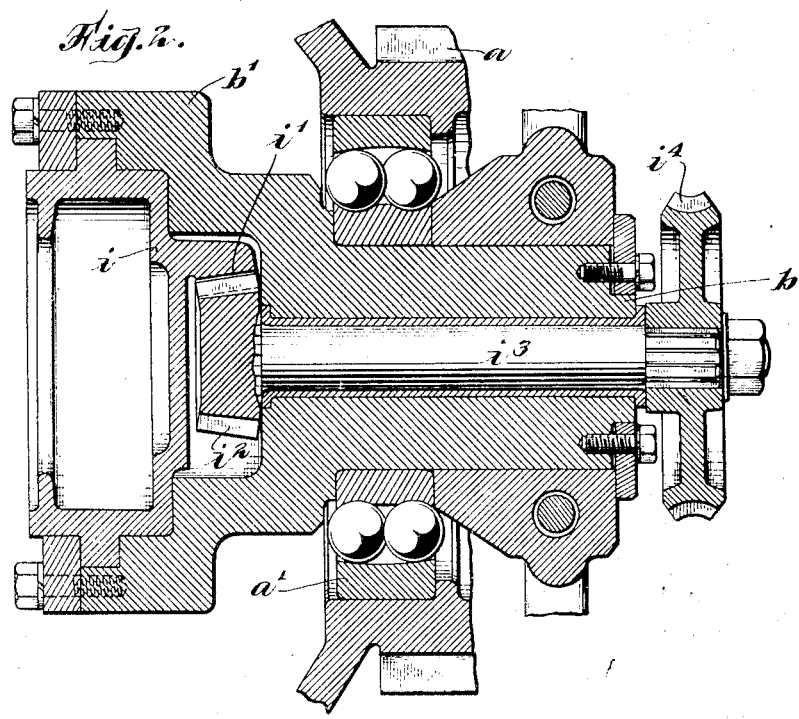
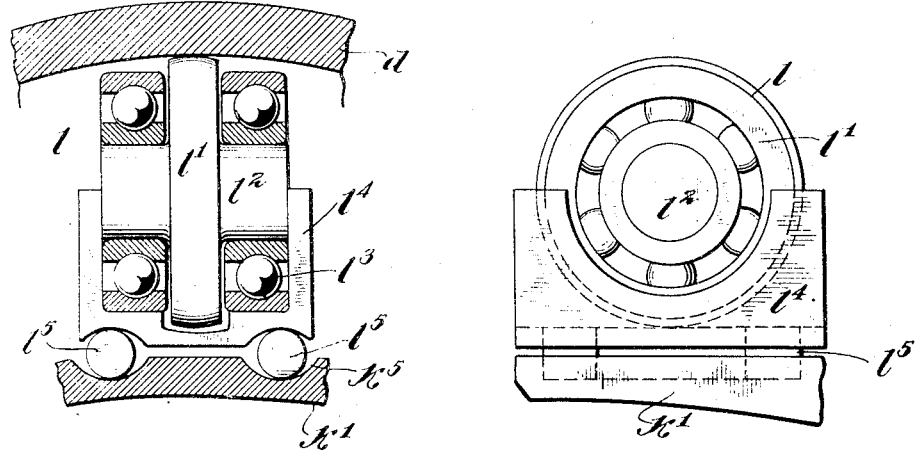

Sept. 17, 1929.     C. W. WEISS     1,728,383
POWER TRANSMISSION DEVICE
Filed Feb. 25, 1927     4 Sheets-Sheet 3

Inventor
Carl W. Weiss
By his Attorneys,
Redding, Greeley, O'Shea & Campbell

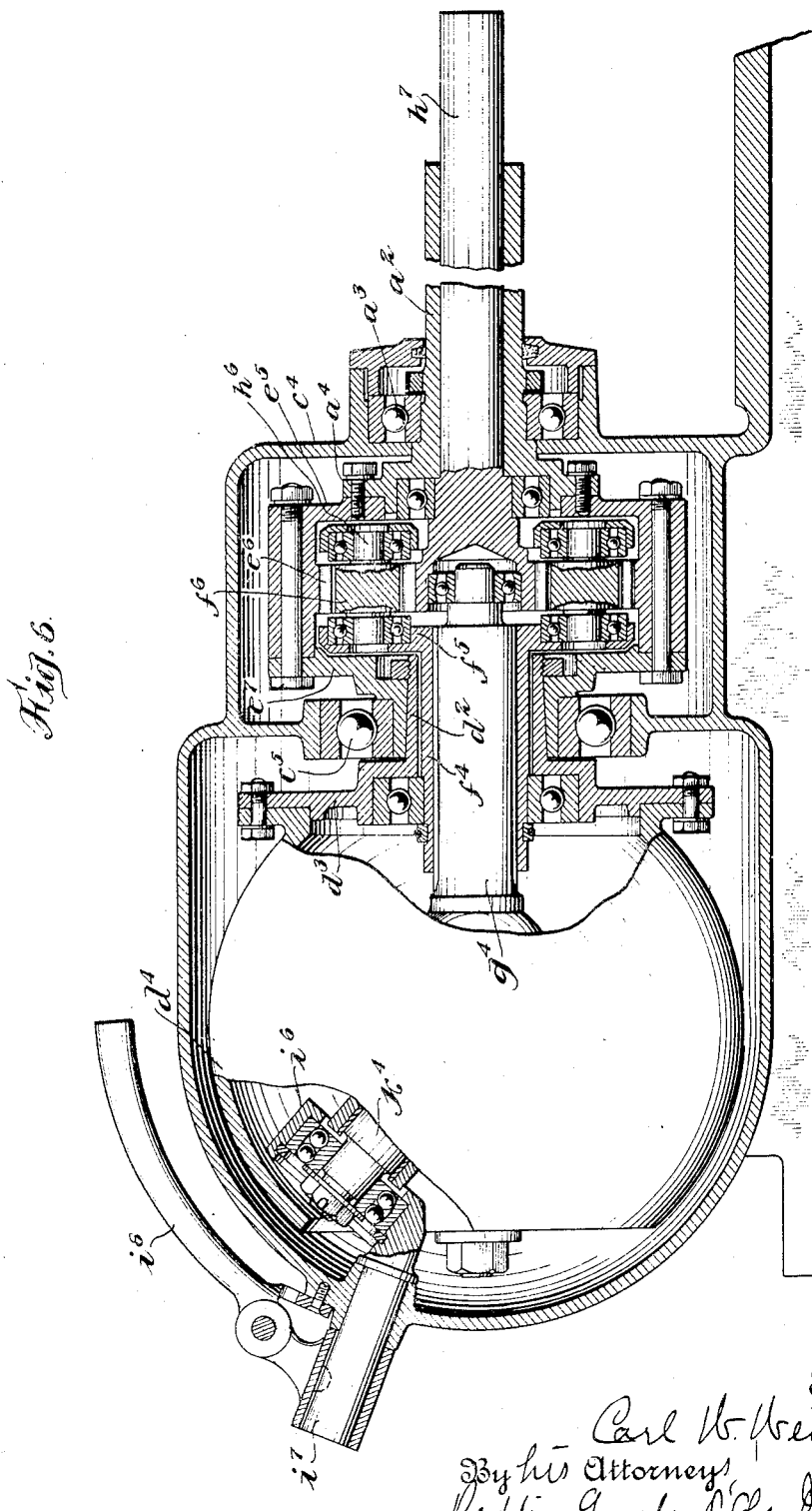

Patented Sept. 17, 1929

1,728,383

UNITED STATES PATENT OFFICE

CARL W. WEISS, OF BROOKLYN, NEW YORK

POWER-TRANSMISSION DEVICE

Application filed February 25, 1927. Serial No. 170,755.

This invention relates in general to power transmission devices of the general character of those shown in Letters Patent of the United States No. 1,141,508, June 1, 1915, and No. 1,146,982, July 20, 1915, and more particularly to that form of the device shown in the Patent No. 1,141,508, in which the spherical body with which the mutor cooperates is itself rotated as the driving member. In the constructions shown in both of said patents a zero speed ratio, that is, a condition of rest, was attained only when the gripping member of the mutor was in the line of the axis of the spherical member, while a 1:1 ratio was attained, as in the present case, when the gripping member of the mutor was in a plane at right angles to such axis, a shift of the mutor through 90° being required for a change of speed ratio from zero to 1:1, or vice versa. This characteristic of the former devices entailed some difficulties in construction and in operation, which have been overcome by the present invention, in accordance with which a reduction gearing of fixed ratio is interposed between the variable speed devices and the driven member, one member of the variable speed device being operatively connected with one member of the reduction gearing, while the other member of the variable speed device is operatively connected with another member of the reduction gearing. By this invention a change of speed of ratio through the whole range, from zero to maximum, is possible with a mutor shift of about 45°.

This permits a simpler and more compact construction of the mutor control means than is possible in the former constructions, particularly in that shown in Patent No. 1,146,982, in which the shifting of the mutor is effected through a link connected to an axially moving member. It also makes possible the use of mechanical means which are well suited for heavy duty and for use in relatively small units, the small mutor shift being favorable to the employment of a strong universal joint in the transmission deflective to a small angle at heavy torque. The improved construction has the further advantages that it is perfectly balanced and that the engagment of the gripping members of the mutor with the spherical cooperating surface is at all times constant.

The invention will be more fully explained hereinafter with reference to the accompanying drawings in which it is illustrated and in which:

Figure 2 is a detail view on a larger scale on the plane indicated by the broken line 2—2 of Figure 1, but on a larger scale.

Figures 3 and 4 are detail views in section on the plane indicated by the broken line 3—3 of Figure 1 and in elevation, illustrating particularly the construction of the gripping members shown on a smaller scale in Figure 1.

Figure 6 is a view in longitudinal section generally similar to Figure 1 but showing a slightly different embodiment of the invention.

Figure 1:
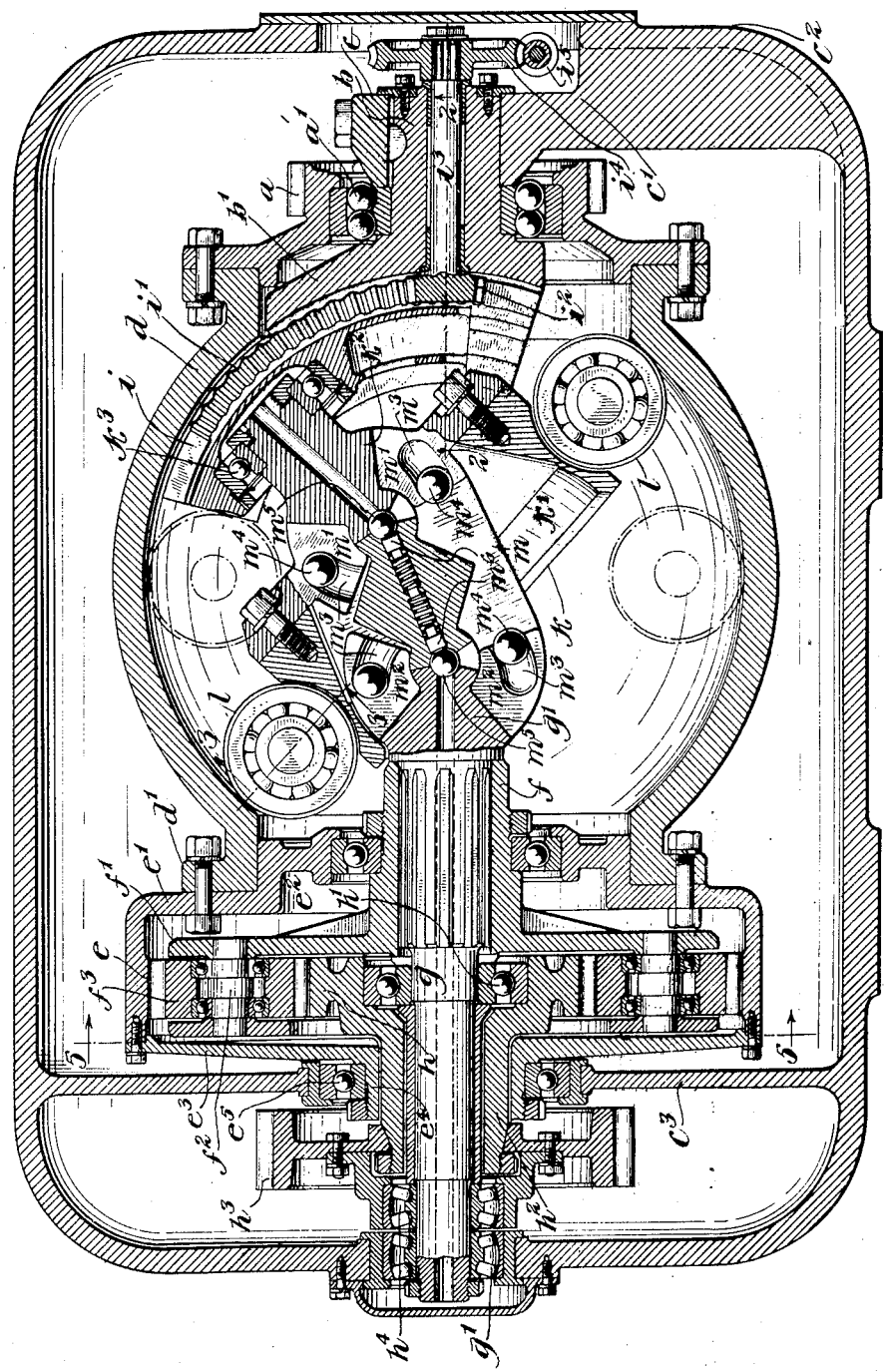
Figure 1 is a view in longitudinal section of one form of a power transmission device which embodies the invention.
Figure 5:
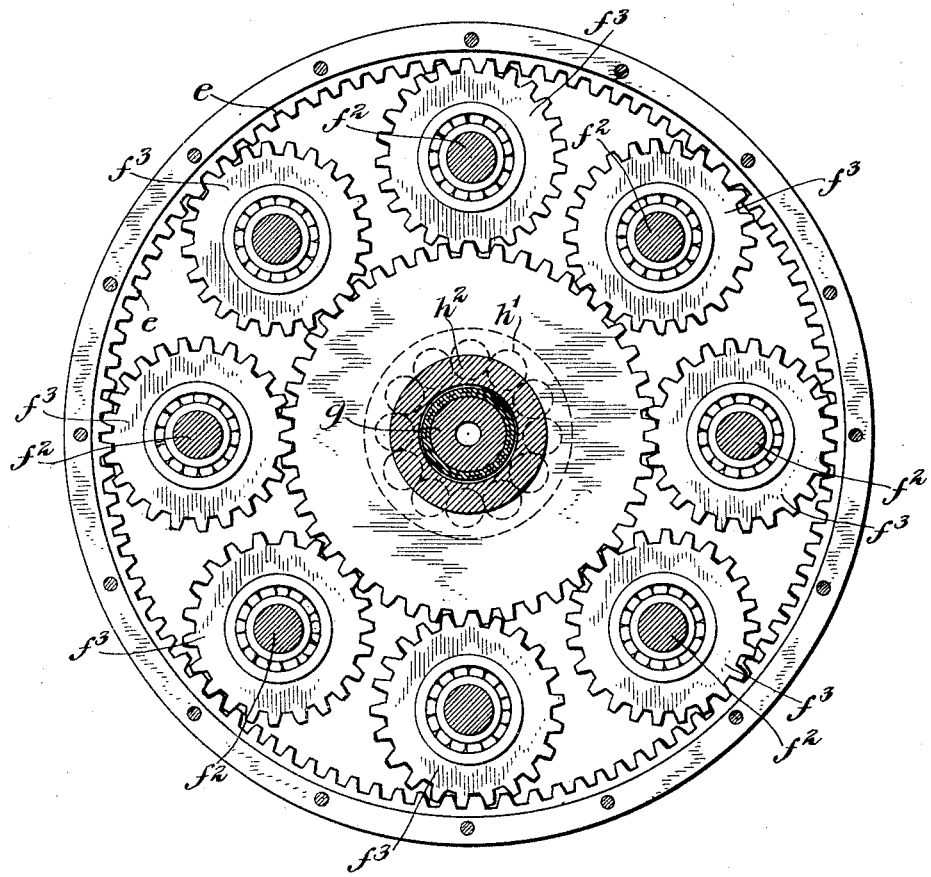
Figure 5 is a view in sectional elevation on the plane indicated by the broken line 5—5 of Figure 1.

In the embodiment of the invention illustrated in Figures 1–5, it may be assumed that power is imparted through a gear $a$ which is supported, through a suitable bearing $a'$, on a sleeve $b$ which is itself held from rotation and from axial movement in a clamp $c$ on a bracket $c'$ which may be formed with the housing $c^2$. The sleeve $b$ is formed with a guideway $b'$ which conforms generally to the curvature of the spherical body hereinafter mentioned, the fixed sleeve $b$ and guideway $b'$ constituting a point of resistance or reactance against which reacts one component of the force transmitted.

The gear $a$ is secured to and transmits movement of rotation to the spherical element $d$, with which coacts the mutor hereinafter mentioned, the spherical cooperating element being herein shown as an internally spherical shell. The spherical element carries with it one member of the epicyclic fixed ratio reduction or change speed gearing hereinafter mentioned, this member being shown as an internal gear $e$, the supporting web $e'$ of which is bolted to the flange $d'$ of the spherical member and is supported through a bearing $e^2$ on a sleeve $f$, which in turn is mounted on and splined to a supporting shaft $g$.

The gear $e$ may also have secured to it a web $e^3$ with a hub or sleeve $e^4$, which is shown as supported by a bearing $e^5$ in a web $c^3$ of the housing $c^2$, the gear $e$ being thereby properly centered and supported for operation.

The sleeve $f$ is formed with a flange or web $f'$ which carries studs $f^2$ on which are mounted pinions $f^3$ for engagement with the internal gear $e$, such pinions also meshing with a gear $h$ supported through a suitable bearing $h'$ on the supporting shaft $g$ and having a hollow shaft $h^2$ which is extended through the sleeve $e^4$ and which carries the driven member or gear $h^3$, the latter being shown as supported on the shaft $g$ by a suitable bearing $h^4$, while the shaft $g$ is itself shown as supported by a suitable bearing $g'$ in the housing $c^2$.

The guideway $b'$ receives and supports for sliding movement a carrier $i$ through which angular shifting of the mutor is effected. As shown, the carrier $i$ is formed with a rack $i'$ for engagement by a pinion $i^2$ on a shaft $i^3$, which may be supported in the sleeve $b$ and may have secured to its outer end a worm wheel $i^4$ for engagement with a worm shaft $i^5$. The latter may be actuated by any suitable means to effect angular displacement of the slide or carrier $i$.

The mutor $k$, which is a shiftable speed-changing or controlling member and through its shifting effects the desired change of speed ratio and cooperates with the spherical body $d$, comprises, in the construction shown, a shell $k'$ and a flanged head $k^2$, to which the shell is bolted, the head $k^2$ being supported for rotation through a suitable bearing $k^3$ by the slide $i$, so that the angular position of the body of the mutor can be shifted. Gripping members $l$ are also an essential part of the mutor, forming the means through which rotation of the spherical member is imparted to the mutor. In the construction shown, the gripping members are arranged in pairs (one of which is shown), the members of each pair being diametrically opposite. As shown, each gripping member comprises a clutch disc $l'$ on a stud shaft $l^2$, which is supported in suitable bearings $l^3$ carried in a block $l^4$, which is supported by balls or rollers $l^5$. The latter are received in recesses $k^5$ of greater radius formed in the body $k'$ of the mutor, so that lateral displacement of the block due to resistance offered by the load, increases its radial distance from the axis of the mutor and causes the clutch disc $l'$ to coact with the internally spherical bearing or clutch surface of the cooperating body $d$, substantially as explained in the several Letters Patent above mentioned.

The spherical, cooperating element $d$, as one member of speed-changing mechanism, is operatively associated, as already described, with one member of the reduction gearing. The other member of the speed-changing mechanism, that is to say, in the present instance, the mutor, is operatively associated, through the sleeve $f$ and pinions $f^3$, with the other member of the reduction gearing, which is thus interposed between the speed changing means and the driven member, such as $h^3$. Association of the spherical member with the internal gear $e$ is accomplished through a rigid connection, but in order to enable the advantages of the present invention to be fully realized the association of the mutor with the other member of the reduction gearing is accomplished through a universal joint. This is preferably of the general character of the joint shown in Letters Patent of the United States No. 1,522,351, January 6, 1925, which lends itself admirably to the requirements of the present invention. The construction of this universal joint, which is found particularly desirable for the purpose of the present invention, is made the subject of a separate application for Letters Patent of the United States about to be filed, but will be described briefly. As shown, the joint comprises the head $k^2$ of the mutor, an intermediate member $m$, and the head $g'$ of the shaft $g$. The several members of the joint are formed respectively with coacting projections $m'$, $m^2$ which are formed on their respectively adjacent faces with intersecting grooves $m^3$ to receive balls $m^4$. The head $k^2$ of the mutor is supported by the bearing $k^3$ in the slide $i$ and by the gripping members $l$ in coaction with the spherical body, while the head $g'$ is supported as already described, by the shaft $g$. The intermediate member $m$ has no external support but is held in cooperative relation with the two members by balls $m^5$ seated in sockets formed in the coacting members and held in place by spring-pressed plungers $m^6$.

In the embodiment of the invention illustrated in Figure 1, power is applied to the transmission device at one end and is taken off at the other end. In some applications of the device it is desirable to permit power to be taken off at the same end of the device at which it is applied. An embodiment of the invention adapted for that purpose is shown in Figure 6, in which power is applied through the sleeve shaft $a^2$, which is supported by a suitable bearing $a^3$ in the housing $c^4$ and has bolted to its flange $a^4$ the flange $e^5$ of the internal gear member $e^6$ of the fixed ratio change speed gearing. The other flange $e^7$ of the gear $e^6$ is supported in a bearing $c^5$ of the casing $c^4$ and has a driven taper fit on a sleeve $d^2$ to the flange $d^3$ of which the spherical cooperating member $d^4$ is secured.

The construction and arrangement of the mutor, in the embodiment of the invention shown in Figure 6, is substantially the same as shown in Figure 1 and need not be described in detail herein. A portion of the head of the mutor is shown at $k^4$ as supported through a carrier $i^6$ mounted on a shaft $i^7$, to which is secured a suitable handle $i^8$. Through a universal joint, such as that shown in Figure 1, the mutor is operatively associated with a shaft $g^4$, to which is splined the sleeve $f^3$, the flange $f^5$ of which carries the pinions $f^6$. The latter mesh externally with the internal gear $e^6$ and internally with a gear $h^6$ on the driven shaft $h^7$. The equivalence of the arrangement shown in Figure 6 and of that shown in Figure 1 will be apparent in the light of the following explanation. The internally spherical driving element $d$ of Figure 1 finds its counterpart in the corresponding element $d^4$ of Figure 6. The mutor, only part of which is shown in Figure 6 is, as stated, the same in construction as the mutor shown in detail in Figure 1, having gripping elements similar to the gripping elements of Figure 1, in contact with the internally spherical element. In the construction shown in Figure 1 the spherical element is operatively connected through the webs $e^1$ and $e^3$ with the sleeve $e^4$, through which the hollow shaft $h^2$ is extended, while in the construction shown in Figure 6 the spherical element is operatively connected through the flange $d^3$, the sleeve $d^2$, the flange $e^7$, and the flange $e^5$ of the planetary gearing with the sleeve $a^2$, through which is extended the driven shaft $h^7$. In the construction shown in Figure 1 the hollow driven shaft $h^2$ is operatively connected through the planetary gearing $h$, $f^3$, $f^1$, sleeve $f$, and universal joint $k^2$, $m$, $g^1$ (to which the sleeve $f$ is keyed), with the mutor, while in the construction shown in Figure 6 the universal joint of the mutor (not shown), is operatively connected through the shaft $g^4$, the sleeve $f^4$ and the planetary gearing with the driven shaft $h^7$. The housing which supports the parts is indicated at $c^2$, $c^3$ in Figure 1 and at $c^4$ in Figure 6. The means to control the angular position of the mutor is indicated at $i$, $i^2$, $i^3$, $i^4$ in Figure 1, and at $i^6$, $i^7$, $i^8$ in Figure 6. Both of these constructions possess a marked structural advantage, through which the transmission device is adapted for different applications, in that the driven shaft, whether at the same end with the driving shaft or at the other end, is exended through a hollow shaft which is operatively associated with the mutor through the medium of the planetary gearing.

In the embodiment of the invention illustrated in Figure 1, the fixed guideway in which the head of the mutor is shifted forms the point of reactance which is essential in order to multiply torque, while in the embodiment of the invention shown in Figure 6, the means there provided for effecting the shifting of the head, of the mutor and for holding it in the adjusted position also forms the point of reactance.

It will be understood, with respect to the operation of both embodiments of the invention which have been described herein, that through the interposition of the fixed ratio change speed gearing between the variable speed mechanism and the driven part, a zero speed ratio is accomplished when the mutor is in an approximately 45° position, as indicated in full lines in Figure 1, and that a change of speed ratio from zero to the maximum is accomplished by a shift of the mutor through approximately 45° from the position indicated by full lines in Figure 1 to that indicated by the broken line position of the gripping members. The described relation is true for the proportions of the several parts of the reduction gearing as shown both in Figure 1 and in Figure 6 of the drawings, and such proportions should be maintained when a change in speed ratio from zero to 1:1 is desired.

For further explanation of the functioning of the improved transmission, it may be stated that the 1:1 ratio is attained in any case when the plane of the mutor, that is the plane of the gripping members is at 90° to the axis of the spherical member, whatever may be the angular relation of the mutor plane for zero speed of the driven shaft. For zero speed of the driven shaft the fixed ratio of the change speed gearing must of course equal the speed ratio of the variable speed mechanism, that is, the speed ratio between the mutor and the spherical member, which is the ratio of 1 to the sine of the angle between the plane of the mutor and the axis of the driven shaft. For example, if the fixed ratio of the change speed gearing is $\frac{1}{.669}$ the mutor must be so positioned that the angle between its plane and the axis of the driven shaft will be 42°, because the mutor speed ratio, that is, the ratio of the variable speed mechanism, is then $\frac{1}{.669}$,—.669 being the sine of 42°. If the mutor should be moved to a position such that the angle between its plane and the axis of the driven shaft is less than 42°, then the rotation of the driven shaft would be reversed, in the particular case just assumed.

It will be understood that various changes in details of construction and arrangement may be made to suit different conditions of use and that, except as pointed out in the accompanying claim, the invention is not restricted to the particular constructions and arrangements shown and described herein.

I claim as my invention:

In a variable speed power transmission device, an internally spherical driving element, a mutor, gripping members carried by the mutor in contact with said spherical element, a sleeve operatively connected with the spherical element, a driven shaft extended through said sleeve, a universal joint connection between said shaft and said mutor, a housing supporting said sleeve and shaft, and means to control the angular position of the mutor to vary the relative speed of the mutor and the spherical element.

This specification signed this 24th day of February A. D. 1927.

CARL W. WEISS.